United States Patent Office 3,225,021
Patented Dec. 21, 1965

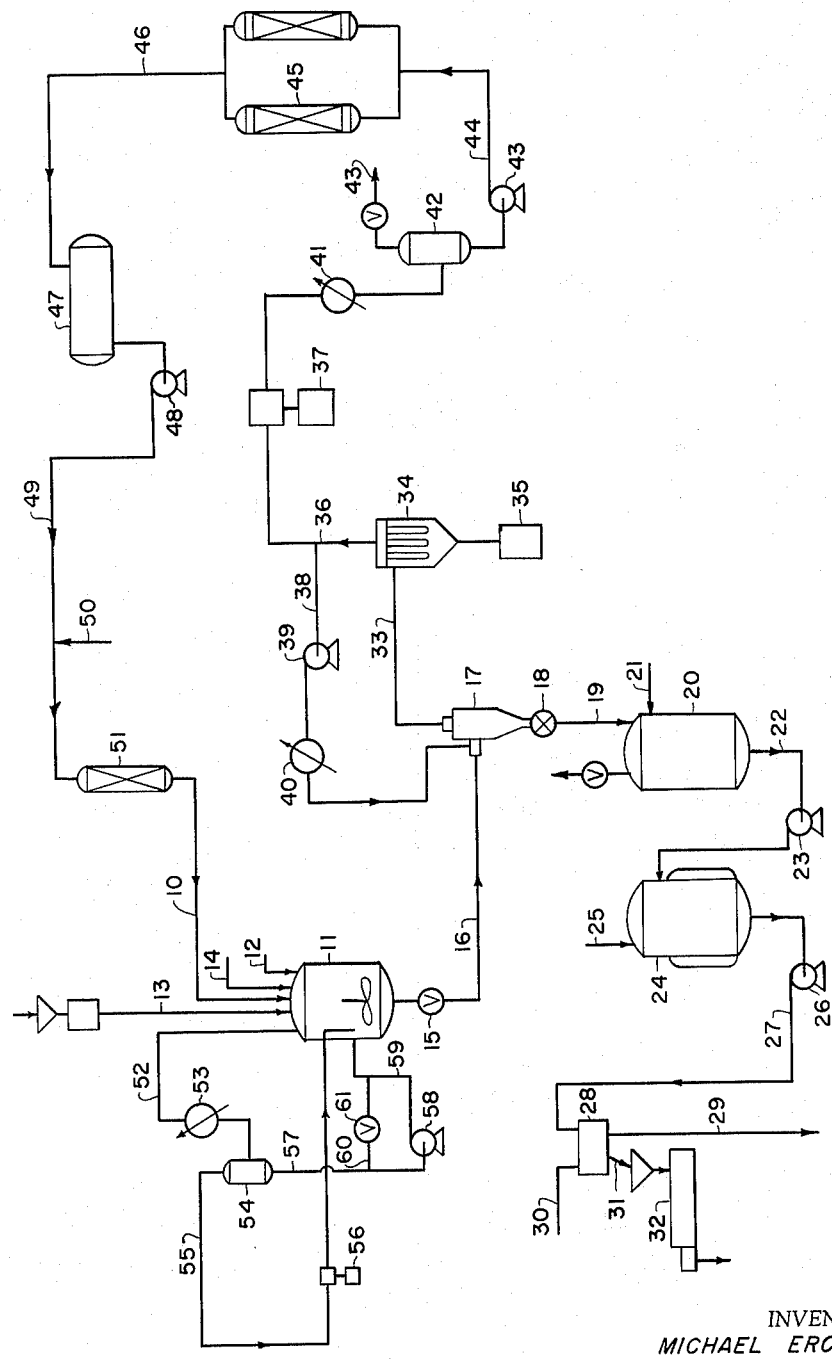

3,225,021
PROCESS FOR POLYMERIZING ALPHA-OLEFINS IN THE PRESENCE OF A MINOR AMOUNT OF A LOWER ALKANE AS THE SOLE DILUENT
Michael Erchak, Jr., Ridgewood, N.J., assignor to Rexall Drug and Chemical Company, Los Angeles, Calif., a corporation of Delaware
Filed Aug. 3, 1962, Ser. No. 214,617
5 Claims. (Cl. 260—93.7)

This invention relates to a process for polymerizing α-olefins to solid high molecular weight polymers. The invention in its preferred embodiment relates more specifically to a continuous process for polymerizing propylene or propylene with other ethylenically unsaturated monomers by a unique system and by control of certain process variables in a novel manner to be set forth hereinbelow.

The polymerization of α-olefins to solid polymers has heretofore been described employing certain catalysts formed by contacting a halide of a reducible metal of the Groups IVa, Va, or VIa of the Periodic Table with a reducing metal or metal compound of Groups Ia and II of the Periodic Table including aluminum. The reducible metal halides include compounds of Group IVa such as titanium, zirconium, hafnium and thorium; Group Va such as vanadium, niobium and tantalum; and Group VIa such as chromium, molybdenum, tungsten and uranium. The reducing metal or metal compounds include Group Ia such as lithium, sodium, potassium, rubidium, cesium, Group II such as beryllium, magnesium, calcium, strontium, barium, zinc and cadmium, and including aluminum such as aluminum trialkyls as well as aluminum alkyl halides. Some of these prior art α-olefin polymerization processes have been described by Natta and others, for example, British Patent 810,023, Belgian 538,782 and Scientific American, September 1957, pages 98 et seq. In these prior art processes the reaction product of a reducible metal halide such as titanium tetrachloride and an aluminum trialkyl are used as a catalyst in a heavy hydrocarbon diluent at low pressures to prepare solid polymers.

The use of heavy hydrocarbon diluents such as hexane or heptane and other normally liquid saturated hydrocarbons, petroleum fractions or aromatics and the like as the sole diluents, solvents or dispersants in α-olefin polymerization reactions has the disadvantage of requiring expensive equipment to recover and purify such diluents for economic operation as well as the requirement of associated equipment for controlling the polymerization reaction. Manufacturers of polypropylene for example utilizing a heavy hydrocarbon diluent process have large investments in plant equipment and facilities which are required to operate such a process, for example, purification, e.g. distillation, recycle and the like processing units.

According to this invention α-olefins such as propylene, butene-1, etc. can be polymerized or copolymerized to solid high molecular weight polymers of high isotactic content by a batch or continuous process but preferably in a continuous process which comprises continuously, or substantially continuously, introducing catalyst and a dispersant comprising liquid α-olefin admixed with a minor amount of a liquid or liquefiable inert diluent to a reaction zone and continuously or substantially continuously withdrawing from said reactor solid high isotactic content α-olefin polymer or copolymers thereof as a slurry in the dispersant which comprises a heterogeneous mixture of solid polymer, liquid monomer and liquid inert diluent. The invention contemplates in a prefered embodiment a technique for permitting build up of the inert liquid diluent within the reactor by recycling a stream comprising α-olefin and inert diluent and by appropriately venting a determined amount of the recycle stream to control the level of the inert diluent as will be explained more fully hereinafter.

In accordance with the preferred embodiment of this invention reference will be made hereinafter to a continuous process for polymerizing propylene and reference to the inert diluent will be understood to mean an inert liquid or liquefiable normally gaseous compound which, as in the case of propylene monomer, will under the conditions of the process be in liquid form in the reaction zine and in some but not all of the remaining processing units.

The process of this invention overcomes undesirable features of prior propylene polymerization techniques and contributes several advantageous and efficient process steps which will be discussed hereinbelow.

Reference is made to the accompanying non-limiting drawing which forms a part of this invention and which is incorporated herein and presents preferred embodiments of the process. The detailed non-limiting examples following a description of the drawing further illustrate the novel features of this process for polymerizing propylene.

In the drawing a liquid feed comprising propylene and an inert diluent under proper conditions of temperature and pressure are introduced via line 10 to the reactor designated generally as 11. A feature of this invention is the provision for the use of liquid propylene, substantially free of detrimental impurities, in combination with about 5% or more, that is, up to 10% or more, of an inert liquid diluent. The preferred embodiment of this invention provides for the use of a minor amount of an inert diluent which is included initially in the liquid propylene feed and operation of the process in a manner whereby inert diluent content builds up to a preferred level and thereafter a portion of a recycle stream is vented in order to reduce or eliminate the level of impurities and to keep the desired liquid propylene inert diluent ratio in the process.

The reactor 11 in the process of this invention can be a pressure resistant vessel of suitable configuration and suitable materials of construction, e.g. glass lined, comprising stirring means, if desired, and being capable of operating at pressures up to 1,000 p.s.i. or higher, but preferably between 250 to 750 p.s.i.g. In the preferred method of operation, a chain transfer agent or molecular weight control agent such as hydrogen can be used, and is introduced to reactor 11 via line 12. One component of the preferred catalyst which can be $TiCl_3$, is introduced via line 13 while the other component which can be diethyl aluminum monochloride, is introduced to the reactor via line 14. It is understood that both of these catalyst components can be metered in continuously by suitable apparatus. These catalyst components however can also be metered into the reaction zone in any form, that is premixed, or substantially continuously provided the polymerization reaction can be kept continuous. Liquid propylene and inert diluent can also be metered in continuously, directly from storage, premixed separately or as indicated in the drawing, or from another source to the reactor by a suitable line arrangement other than illustrated.

From the lower section of the reactor 11 after polymerization of propylene monomer to the desired solids content (associated with residence time) there is withdrawn a slurry of polymer in liquid propylene and inert diluent through a suitable valve 15 or the like mechanism for continuous or substantially continuous discharge, that is, as long as the process can be kept continuous, through line 16 to a cyclone 17 or other suitable apparatus which is operated at about one atmosphere or about 0 p.s.i.g. The pressure in cyclone 17 should be sufficiently low to allow separation of the solids from the liquid by flashing of the monomer and other volatiles and recovering from the cyclone a polymer substantially free of volatiles. The solid polymer recovered from cyclone 17 is discharged through a suitable valve or feeder 18, to line 19 and then to quench tank 20 where the catalyst is deactivated by a suitable alcohol such as a $C_1$ to $C_4$ aliphatic alcohol, e.g. methanol, isopropanol or butanol, introduced through line 21 in an amount of from about 10 to 1000 parts by weight per 100 parts by weight of polymer, preferably from 100 to 300 parts of alcohol. The quenching temperature can vary from 100 to 300° F. with an average residence time of the polymer in the quench tank of from 5 minutes to an hour or two. After the quench treatment the polymer is taken from the bottom of the tank via line 22, pump 23 to wash tank 24 where additional alcohol and a small amount of HCl, about .05% (the amount can range from .005 to 0.5% or more) by weight based on the alcohol, can be added to the mixture by line 25 to cause complete solubilization and deactivation of the catalyst. In the wash tank steam can be introduced to a jacket surrounding the tank in order to keep the desired temperature of from 100 to 200° F. therein. The amount of additional alcohol used to wash the polymer and the treating time can be the same as in quench tank 20. From the wash tank the washed polymer slurry is taken via pump 26 to line 27 and centrifuge 28, typically a basket centrifuge (or other convenient type such as a solid bowl centrifuge) for the separation of polymer from the alcohol. The filtrate is taken through line 29 to distillation and drying (not shown). The polymer cake can be washed further with alcohol if desired, for example, with from about 25 to 300 parts by weight of alcohol per 100 parts by weight of polymer at a temperature of 100 to 200° F. for from 2 to 10 minutes (total cycle time). The additional alcohol can be introduced through line 30 while the washed polymer is taken through line 31 to a dryer 32 for further processing.

Referring to cyclone 17 wherein polymer and propylene monomer and volatile impurities are first separated by flashing, propylene and inert diluent vapor as well as other volatiles are taken overhead through line 33 to filter 34 (typically a bag filter) to remove entrained dust or solids. The entrained solids are collected in dust collector 35 and disposed of in any suitable manner. Propylene and inert diluent from bag filter 34 are taken via line 36 and part of the propylene and inert diluent are taken to recycle compressor 37 wherein the mixture is compressed to above about 250 p.s.i.g. or more, that is to the appropriate pressure corresponding to about reactor pressure. Part of the propylene and inert diluent from line 36 is diverted to line 38 prior to compression, and then to blower 39 and heater 40. The heated propylene and inert diluent vapor from heater 40 are recycled to cyclone 17 to aid in the separation of volatiles by flashing of the polymer slurry. This feature of recycling a partial amount of hot recycle vapor aids the efficiency of separation of unreacted propylene from the slurry in line 16 to cyclone 17 in a continuous process for polymerizing propylene although it is noted that such a technique can be applicable to a batch process.

The amount of hot propylene and inert diluent vapor recycled to cyclone 17 can vary depending on the temperature and solids content of the effluent slurry from the reactor to the cyclone. Where proper conditions exist, allowing the flashing of volatiles from the cyclone and separation of polymer therefrom so that the polymer contains in the order of from 5 to 2% or less volatile material (that is, a polymer substantially free of volatile substances), then propylene and inert diluent can be taken directly to compressor 37 without diverting a portion thereof for recycle to the cyclone. When the relationship between reactor solids content and reaction temperature precludes efficient flashing to dry polymer (e.g. of about 2% or less volatile content), then additional heat can be added: (1) by feeding the reactor effluent to a heating unit, e.g. a heat exchanger (not shown) before it is introduced to the cyclone, (2) by the addition of hot propylene and inert diluent to the cyclone by recycling and heating a part of the flashed volatiles from the cyclone as indicated in the drawing. One skilled in the art can calculate the temperature of the slurry required to get complete vaporization of the propylene and inert diluent in the cyclone from a known percent solids concentration of the slurry from the reactor and a known concentration of inert diluent. The amount of propylene and inert diluent recycled can vary between about 0.1 lb. to 10 lbs. per pound of polymer. The propylene and inert diluent recycled to the cyclone can be heated to from 170° to 300° F. or more in heater 40, while the temperature in the cyclone can be kept between about 40 to 150° F.

Where an inert diluent such as propane in amounts of about 15 to 35% of the liquid content is employed in the process of this invention, appropriate adjustment of recycle stream to the cyclone can be made by one skilled in the art. When propane liquid is used in the amounts stated higher conversions of propylene monomer, that is a higher solids content, is possible for a given volume of liquid feed and the amount of propylene and the amount of heat required to flash volatiles such as propane and propylene will change depending on the propane-propylene ratio in the flash chamber (propane boils at $-42.1°$ C. while propylene boils at $-47.7°$ C.). Thus, adjustment of the recycle stream to the cyclone can be made depending on the inert diluent used in the process and on its concentration.

The compressed recycle stream from compressor 37 is condensed in condenser 41 and led to accumulator 42. In accumulator 42, provision is made according to the process of this invention to vent a determined proportion of the recycled contents through line 43 in order to reduce the impurity level and to maintain the desired ratio of liquid propylene/liquid inert diluent throughout the continuous process. Thus since the inert diluent is not consumed in the reaction as is liquid propylene, the amount of this diluent will build up by continuous cycling and therefore by recovering by venting or otherwise part of this recycled inert diluent the level or amount desired in the reaction can be kept constant. For example, when liquid propane or butane is originally added to the feed stream in a concentration of about 5% by weight, the amount of propane or butane will thereafter increase by continuous recycle to the amount desired in the system. The employment of the inert diluent in total amounts of from 20 to 30% by weight in the reactor liquid is advantageous in that better control of the reactor slurry contents for a given conversion can be realized, including a higher percent conversion of total introduced propylene. It has been found that the desired range of total inert diluent liquid to be used in the continuous process is in the order of about 5 to about 35%, preferably 20 to 30%. Amounts, however, as high as 50% can also be used without losing the advantages of operation according to this process.

In the process of this invention provision is made for removing, by venting for example, from line 43 or other suitable zone, from 1 to 30% of the feed to keep the desired propylene/inert diluent ratio in the recycle stream, that is, whether the amount desired throughout the process is 5% or 35%. One skilled in the art can readily calculate the amount of venting required to keep a recycle stream containing a desired ratio of propylene/inert diluent liquid in the process.

The recycle contents from accumulator 42 are next taken to pump 43, line 44 and then through one of two dryers in parallel 45 for eliminating any detrimental impurities. The dryers 45 are operated in alternate cycles, while one is in use the other is in the process of regeneration. Any suitable material such as activated alumina, silica gel or molecular sieves of the appropriate size can be used for treating the recycle stream. From either dryer the recycle contents in liquid form are taken via line 46 to recycle storage tank 47, pump 48 and line 49 as indicated in the drawing. Fresh propylene can be introduced through line 50. The recycle liquid stream and fresh propylene can be further contacted with a dryer if desired in dryer 51 (e.g. silica gel) as indicated in the drawing. Although only one unit is indicated it is obvious that two dryers such as indicated at 45 can be provided in this case. From this last dryer 51 liquid feed is taken by line 10 to the reactor.

In the continuous process according to the unit arrangement of the drawing, propylene and inert diluent boil and vaporize in reactor 11 which is normally operated at 120 to 212° F. and 250 to 700 p.s.i.g. Vaporized propylene and inert diluent are withdrawn via line 52, condensed in condenser 53 and introduced into receiving vessel 54 for further recycle. In receiving vessel 54 if hydrogen is being used, the hydrogen will be taken overhead via line 55 and compressed in hydrogen compressor 56 prior to recycle to the reactor. Liquid propylene and inert diluent are taken via line 57, pump 58 and line 59 to the reactor. By-pass line 60 and valve 61 are also provided in this scheme for recycle. It can be appreciated that the amount of inert diluent vaporizing with liquid propylene in this process depends on the partial pressure thereof exerted in the reactor as well as on the type of inert diluent used.

The vaporized propylene and entrained solids leave through line 52 as mentioned and can be taken to a cyclone (or a barometric condenser or combination of these, not shown) where the solids and any liquid from the vapor stream are separated from gaseous constituents. To ensure that entrained solids, liquid and condensed matter are washed back to the reactor, the liquid feed can be introduced into the cyclone if desired. The liquid feed added to the cyclone washes down any solids, e.g., catalyst and polymer particles, and this mixture is reintroduced to the reactor through an appropriate conduit which can extend below the liquid level in the reactor or which can be provided with an external seal loop. It should be understood that the pressure maintained in any cyclone arrangement as described should be sufficient to allow operation according to the technique herein described. The amount of feed introduced to the cyclone can range from 5 to 100% of the feed or a recycle stream. Temperature control within the reactor is also aided favorably by this technique.

As illustrated above the method of cooling the polymerization reaction mixture involves vaporization or boiling of the liquid contents which thereby removes heat from the reactor with subsequent contact of the vaporized gases with a heat exchanger such as 53 to condense the vapor and remove heat therefrom and thence recycle either in toto to a cyclone (not shown) or only partially, the remainder of the liquid being introduced to the reactor by the indicated means.

In actual operation there can be vaporized from the reactor from 2 to 10 lbs. of propylene and inert diluent for each pound of propylene polymer formed. The amount of vaporization, it will be understood, varies with the polymerization temperature and can also vary with the pressure employed and the desired degree of cooling. Additional cooling by means of cooling medium circulated about a jacket surrounding the reactor can also be employed if desired.

Although the process of this invention can be practiced with any of the catalysts heretofore described by Ziegler, Natta and others in the prior art, a specifically suitable catalyst which is highly effective for the polymerization of propylene is a preformed partially reduced transition metal halide, such catalyst being activated with an organometallic compound such as an aluminum tri- alkyl or a dialkyl aluminum monohalide. A partially reduced transition metal halide such as titanium trichloride can be improved by milling prior to promotion with an aluminum alkyl. In this manner very high polymerization rates and high polymer isotactic content are obtained as well as minimum reactor fouling.

The preferred catalyst is a titanium trichloride activated with diethyl aluminum monochloride or with an aluminum trialkyl and diethyl aluminum monochloride.

Titanium trichloride cocrystallized with aluminum chloride is available commercially. Titanium trichloride, however, can be prepared by several methods known to the art including the reduction of titanium tetrachloride with aluminum powder or with titanium or mixtures of titanium and aluminum powder, by the use of hydrogen at temperatures above about 650° C., by the use of a metal alkyl such as aluminum triethyl in an inert diluent at temperatures above 100° C. or electrolytically. It will thus be seen that there are many methods for preparing the partially reduced transition metal halide, such methods forming no part of this invention. As purchased from commercially available sources, however, the titanium trichloride and cocrystallized aluminum chloride have a composition: 1 mol $TiCl_3$:.33 mol $AlCl_3$.

The titanium trichloride can be activated with an aluminum trialkyl such as aluminum triethyl or an aluminum compound of the general formula $R_1R_2AlX$, wherein $R_1$ and $R_2$ are similar or dissimilar and each represents a hydrogen atom or a hydrocarbon radical such as an alkyl, alkaryl, aryl, aralkyl, alkenyl, alkynyl, cycloalkyl, or cycloalkenyl and X represents a hydrogen atom, a halogen, an alkoxy or aryloxy group or the residue of a secondary amine or an amide, mercaptan, thiophenol, carboxylic acid or a sulphonic acid. The aluminum compound can also be represented by the general formula $RAlY_1Y_2$ where R is the same as above and $Y_1$ and $Y_2$ are similar or dissimilar and each represents a halogen, an alkoxy or an aryloxy group.

The catalyst components can be introduced into the reactor separately or in liquid propylene or in the inert diluent, for example hexane or heptane. Thus, diethyl aluminum monochloride can be introduced into the reactor as a composition in liquid propylene, for example a propylene composition containing about 1.5% by weight of diethyl aluminum monochloride. Higher percentage weight compositions can be prepared if desired, e.g. 7 to 10% although the pyrophoric limit of the composition should preferably not be exceeded. The solid $TiCl_3$ catalyst can be introduced to the reactor as such or it can also be introduced in liquid propylene or inert diluent or as a premixed composition with diethyl aluminum monochloride.

As stated hereinbefore combinations of catalysts can be used in the polymerization process, for example mixtures of titanium trichloride prepared by the reduction of titanium tetrachloride with hydrogen, with an aluminum alkyl or aluminum powder, such titanium trichloride being subsequently promoted with triethyl aluminum or diethyl aluminum monochloride or both. Titanium trichloride promoted with diethyl aluminum monochloride yields consistently under the process conditions of this invention polypropylene of an isotactic content of above 90 to 95%.

The catalyst concentration employed in the polymerization process of this invention is preferably in the range of about 0.03 to 0.5 weight percent or higher based on the total monomer present. The amount of catalyst used should be sufficient to convert the desired amount of propylene to polymer continuously and economically and to give a polymer of uniform properties. The catalyst composition itself insofar as aluminum to titanium ratio can be varied widely although it is preferred to employ a catalyst of an aluminum to titanium mol ratio of about 0.02 to 6.0 or 12 of aluminum to 1 of titanium. A preferred range is 0.5:1 to 4:1.

The propylene polymerization rate in the reactor can be controlled by regulating the amount of catalyst introduced. Thus by reducing the catalyst concentration in the liquid monomer the reaction rate can be conveniently decreased, allowing good removal of the reaction heat by autothermic means and therefore good temperature control. A particular amount of catalyst for good polymerization rate and heat control is a total catalyst concentration of from 0.5 gram per liter to about 0.2 gram per liter.

The polymerization temperatures employed in the process of this invention are not critical and can range from about 50 to 212° F. with a preferred range being from 120° to about 176° F. When low temperatures are used, for example from 75 to 130° F., a high isotactic content polypropylene results. Also by the use of lower temperatures, for example 80° F. and long retention times in the reactor, the molecular weight of the polymer can be controlled to some extent. In other words long retention times at low polymerization temperatures result in a high molecular weight polymer having a high reduced specific viscosity. On the other hand higher temperatures, that is from say 150° to 175° F. and lower retention times results in a polymer of increased amorphous content. The higher temperatures also tend to affect molecular weight and therefore a polymerization temperature of 175° F. with a shortened retention time in the reactor results in a polypropylene of low molecular weight and as a consequence a low reduced specific viscosity.

It is preferred to operate the process at a percent conversion rate that will allow efficient cooling and processing of the solids in the reactor as well as processing downstream of the reactor, that is, at a solids content that will allow efficient separation in the flash zone by the use of the sensible heat in the reactor slurry. It is preferred therefore to operate at conversions of propylene of from 10 to 80 percent, that is to adjust the catalyst feed rate and/or residence time (temperature also affects catalyst activity and hence conversion at any given residence time) to obtain from 10 to 80% or 90% conversion of monomer to polymer in the reactor, depending on the amount of inert diluent present in the process. High conversions according to this process are possible because of the employment of an inert liquid diluent in concentrations of from 5 to 50% by weight.

The inert diluents that are applicable in the process of this invention are normally gaseous or liquid hydrocarbons such as paraffinic hydrocarbons of from 3 to 12 carbon atoms per molecule. Exemplary of the normally gaseous diluents which, according to this invention, are compressed for use as liquids in the process are propane, butane and isobutane. Diluents such as normal pentane, isopentane, hexane, cyclohexane, heptane, octane, decane, etc. are also applicable, as are aromatic hydrocarbons such as xylene and toluene. The use of liquefiable or liquid inert diluents with liquid propylene in the preferred amounts herein stated as a heterogeneous dispersant and reaction medium provides unique versatility and economy to α-olefin polymerization processes.

To control the molecular weight of polypropylene polymer or copolymer it is desired to employ a chain transfer agent. While this invention has reference to the use of hydrogen as indicated in the drawing to control molecular weight, other molecular weight control agents are contemplated. By the use of a molecular weight control agent such as hydrogen a polymer of any commercially desired melt index (that is, from about 2 to 9) can be produced in accordance with this continuous process. A standard measure of the melt flow of the polymer is the melt index test described in detail in ASTM–D–1238–52–T. A molecular weight expressed in terms of intrinsic viscosity (measured in teralin at 125° C.) of more than 4.0 is usually considered somewhat high. In the process of this intion, in order to reduce intrinsic viscosity or molecular weight it is preferred to use from 15 to 700 parts per million by weight of hydrogen based on the propylene in the feed stream. Hydrogen can also be used to control the molecular weight of the copolymers which can be prepared by the process of this invention, for example propylene-ethylene and propylene-butene and the like.

In addition to hydrogen other molecular weight controlling agents such as organometallic compounds of zinc, for example zinc diethyl and ethyl bromide can also be used. The molar ratio of the zinc compound to the aluminum alkyl that can be employed is within the range of 0.002:1 to 0.2:1, the preferred ratios being 0.0:1 to 0.1:1 with zinc diaklyls containing up to five carbon atoms.

The polymerization pressures used in the reactor must be sufficiently high to keep propylene and inert diluent in the liquid phase at the temperature of reaction. Thus it is known that propylene liquefies at room temperatures (e.g. 20° C.) at a pressure of approximately 10 atmospheres or 150 pounds per square inch gauge. The pressure employed in the reactor in the process of this invention is preferably therefore in the order of from 250 to 750 pounds per square inch gauge, these pressures thus assuring that the reactor contents are in liquid form.

The polymerization process of this invention is practiced in the complete or substantial absence of catalyst poisons such as air, water, alcohols and the like. Even after polymerization and catalyst deactivation, care must be exercised in preventing contact of the crude polymer with air prior to the incorporation of suitable additives.

The following examples are presented to illustrate further the continuous polymerization of propylene by a process scheme such as indicated in the attached drawing.

*Example 1*

In a continuous run in apparatus exemplified in the attached drawing there is charged to reactor 11 liquid propylene containing liquid propane in an amount sufficient to maintain 30% propane in the reactor liquid (propylene feed rate of about 122 lbs. per hour). A titanium chloride-diethyl aluminum chloride is employed as the catalyst at an Al/Ti ratio of about 2:1 at the preferred concentration hereinbefore indicated of from 0.03 to 0.5 weight percent based on the monomer. The polymerization temperature is kept at about 130° F. at a pressure sufficient to maintain the propane and propylene in the liquid state. Solid propylene polymer, about 29% solids, is continuously recovered from reactor 11 in liquid propane-propylene slurry. The polymer after deashing as hereinbefore described is found to consist of predominantly isotactic molecular structure, that is 94 to 95% heptane insolubles.

*Example 2*

The procedure of Example 1 is repeated except that the weight percent solids in the reactor slurry is allowed to increase to between 33 to 34%. The polymer recovered has an isotactic content of nearly 95% as measured by percent heptane insolubles.

Polymerizations of propylene according to the process of this invention in bench scale units demonstrate the ease of operability of this process when concentrations of propane in liquid propylene of from 9 to over 30% are included. Also in experimental runs in the apparatus illustrated in the drawing it was found that good control of process conditions could be maintained when propane was present in the recycle in amounts of 5% and higher.

It is preferred to operate a continuous process as herein described since for a given reactor size a continuous reactor has greater capacity because its actual time and service is greater than in the batch system. Moreover a continuous operation has the advantage over a batch process of ordinarily producing product of uniform quality. It is known for example that in a batch operation it is difficult to control reproducibility from batch to batch although the conditions for each batch are maintained substantially identical. Thus in a batch process the properties of the polymer are subject to variation within the batch because the relative amount of liquid and vapor change due to conversion of propylene to polymer. Process variables are therefore more adequately controlled in a continuous operation.

Although reference has herein been made to the polymerization of propylene, the process is applicable to the polymerization and copolymerization of other α-olefins such as butene-1, pentene, hexene and equivalent monomers.

Resort can be had to modifications and changes in the process falling within the scope of the appended claims.

I claim:

1. A continuous process for polymerizing an alpha-olefin which comprises: (a) continuously introducing said alpha-olefin in liquid form and a minor amount of a normally gaseous inert diluent in liquid form to a reaction zone which is maintained at a pressure sufficient to keep said alpha-olefin and inert diluent in liquid form, said amount of inert diluent being sufficient to constitute between 5 to 50% of the liquid in said reaction zone; (b) continuously carrying out the polymerization by introducing a titanium trichloride and an aluminum alkyl catalyst into said reaction zone; (c) continuously withdrawing from said reaction zone a reaction slurry comprising liquid alpha-olefin, inert diluent and polymer; (d) continuously separating polymer from said alpha-olefin and inert diluent; and (e) continuously maintaining the 5–50% of the inert diluent of step (a) in the reaction zone by venting from 1–30% of the alpha-olefin and inert diluent of step (d) and recycling the remainder to the reactor.

2. A continuous process for polymerizing propylene to a high isotactic content polypropylene which comprises: (a) continuously introducing liquid propylene and a minor amount of a normally gaseous inert diluent in liquid form to a reaction zone which is maintained at a pressure sufficient to keep said propylene and inert diluent in liquid form, said amount of inert diluent being sufficient to constitute between 5–50% of the liquid in said reaction zone; (b) continuously carrying out the polymerization by introducing a titanium trichloride and an aluminum alkyl catalyst into said reaction zone; (c) continuously withdrawing from said reaction zone a reaction slurry comprising liquid propylene, inert diluent and polymer; (d) continuously separating polymer from said propylene and inert diluent; and (e) continuously maintaining the 5–50% of the inert diluent of step (a) by venting from 1–30% of the propylene and inert diluent of step (d) and recycling the remainder to the reactor.

3. The process of claim 2 wherein the inert diluent is propane.

4. The process of claim 2 wherein the inert diluent is butane.

5. A continuous process for polymerizing propylene to a highly isotactic content polypropylene which comprises: (a) introducing in liquid form to a reaction zone a feed comprising essentially from 90–95% propylene and from 5–10% of a normally gaseous inert hydrocarbon diluent, said reaction zone being maintained at a temperature of from 50° to 212° F. and a pressure of from 250–750 p.s.i.g.; (b) maintaining from 5–50% of the inert diluent in liquid form in the reaction zone during the polymerization; (c) continuously carrying out the polymerization in the presence of a titanium trichloride and an aluminum alkyl catalyst; and (d) venting from the reactor effluent an amount of inert diluent and propylene sufficient to maintain between 5–50% of said inert diluent in liquid form in the reaction zone.

References Cited by the Examiner
UNITED STATES PATENTS

| | | | |
|---|---|---|---|
| 2,484,384 | 10/1949 | Levine | 260—93.7 |
| 2,588,358 | 3/1952 | Carlson et al. | 260—683.15 |
| 3,002,961 | 10/1961 | Kirschner et al. | 260—93.7 |
| 3,023,202 | 2/1962 | Schappert | 260—94.9 |
| 3,126,365 | 3/1964 | Hooker | 260—94.9 |

JOSEPH L. SCHOFER, *Primary Examiner.*